Figure 1:
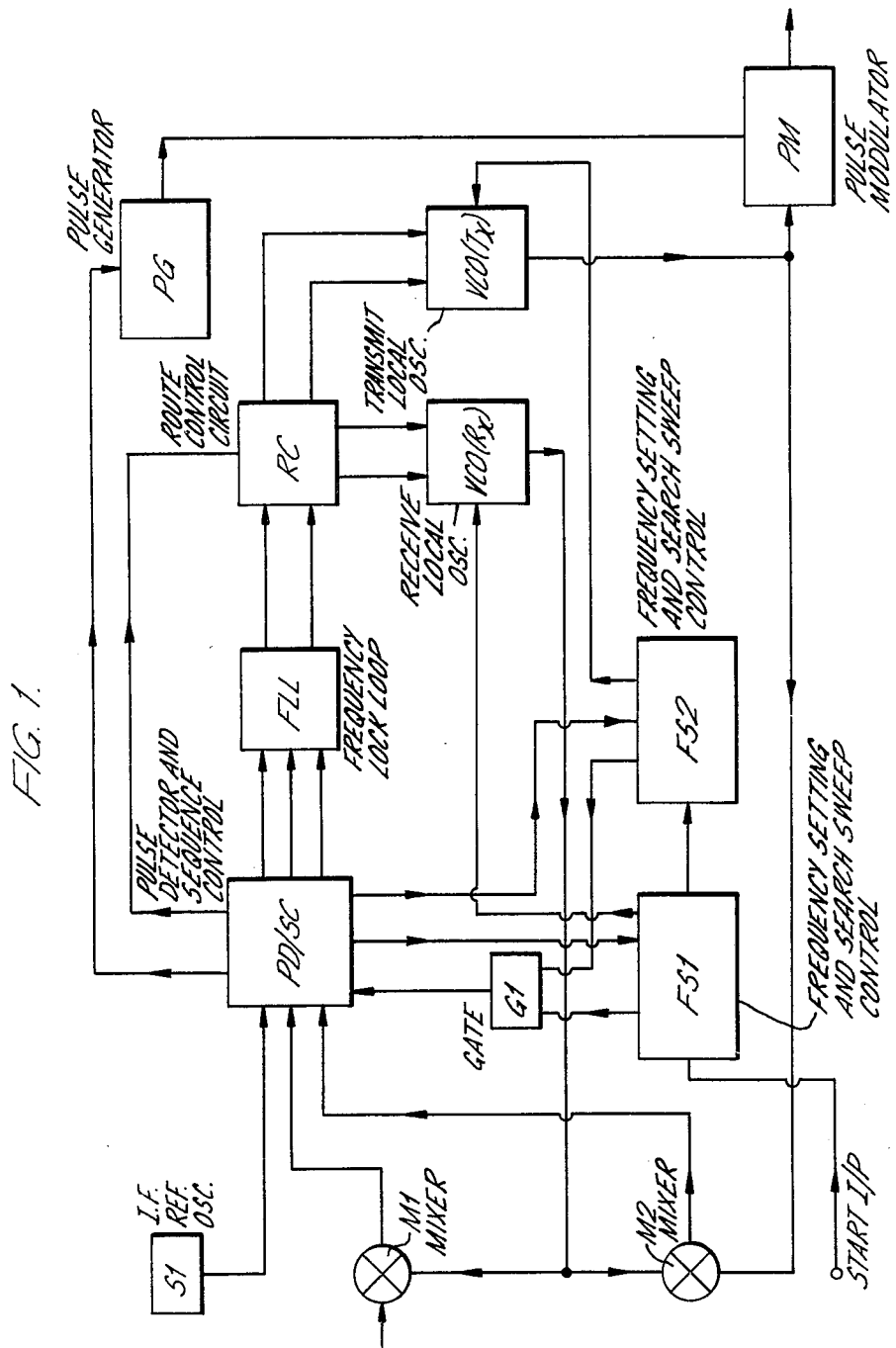

United States Patent [19]

Guest

[11] 4,214,205

[45] Jul. 22, 1980

[54] RADIO RECEIVING AND RETRANSMITTING APPARATUS WITH FREQUENCY LOCK CIRCUIT

[75] Inventor: Ashley W. Guest, Bristol, England

[73] Assignee: British Aircraft Corporation, London, England

[21] Appl. No.: 922,218

[22] Filed: Jul. 5, 1978

Related U.S. Application Data

[63] Continuation-in-part of Ser. No. 731,357, Oct. 12, 1976, abandoned.

[51] Int. Cl.$^2$ ............................................. H04B 7/155
[52] U.S. Cl. .......................................... 455/20; 455/22
[58] Field of Search ...................... 325/1, 9, 11, 17, 13; 343/179

[56] References Cited

U.S. PATENT DOCUMENTS

| | | | |
|---|---|---|---|
| 3,675,132 | 7/1972 | Hansen | 325/11 |
| 3,860,870 | 1/1975 | Furuya | 325/9 |
| 3,940,695 | 2/1976 | Sickles | 325/11 |

FOREIGN PATENT DOCUMENTS

| | | | |
|---|---|---|---|
| 660139 | 10/1951 | United Kingdom | 325/1 |
| 1091640 | 11/1967 | United Kingdom | 325/1 |
| 1192680 | 5/1970 | United Kingdom | 325/1 |

Primary Examiner—Benedict V. Safourek
Assistant Examiner—Michael A. Masinick
Attorney, Agent, or Firm—Stevens, Davis, Miller & Mosher

[57] ABSTRACT

In radar apparatus for actively enhancing and retransmitting a received radar signal, the incoming signal is mixed with the output of a first local oscillator, the resulting signal being supplied to a frequency lock loop which varies the frequency of the first local oscillator until the frequency of the resulting IF signal is equal to a first reference IF frequency. The first local oscillator output is mixed with the output of a second local oscillator, the frequency of which is varied until the frequency of the resulting second IF signal is equal to a second reference IF frequency. The output from the second local oscillator is retransmitted. The first and second reference IF frequencies are identical if the frequency to be retransmitted is the same as the incoming RF carrier frequency.

7 Claims, 5 Drawing Figures

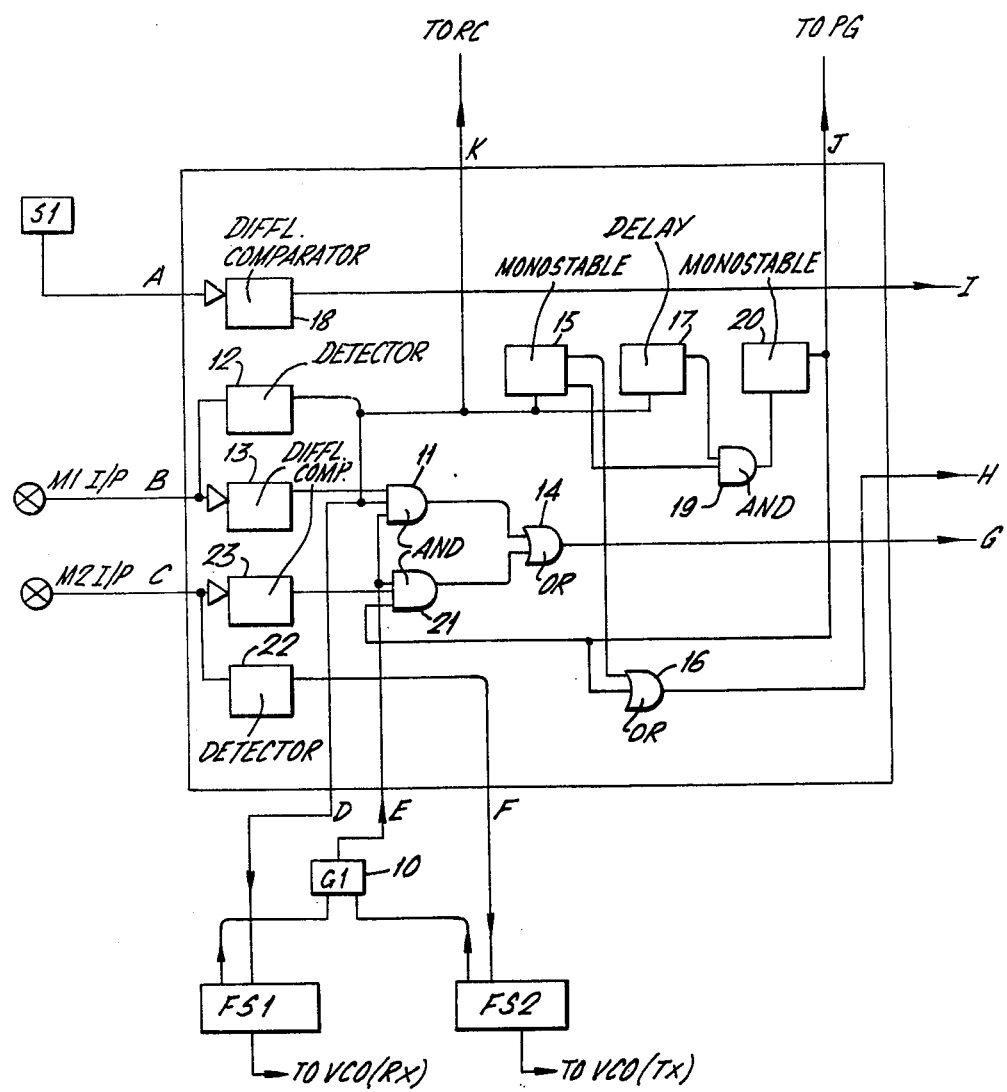

RADIO RECEIVING AND RETRANSMITTING APPARATUS WITH FREQUENCY LOCK CIRCUIT

This is a continuation-in-part of application Ser. No. 731,357 filed Oct. 12, 1976 now abandoned.

This invention relates to a frequency regenerator for retransmitting a received radar signal. This is in contrast to a system in which the received radar signal is merely reflected from the object being detected, and it has the advantage of considerably extending the range over which a moving object can be detected or controlled by radar.

With an active enhancer of this type, it is desirable that the receiver should be capable of receiving radar pulses over the whole of the RF bandwidth, and that it should be able to respond to RF pulses which may be no longer than, say, 100 nanoseconds long. Moreover, it would be an advantage if the regenerated frequency could be transmitted with a variable delay and/or at some frequency which has a variable offset to the command radar frequency.

In accordance with the present invention, a method of detecting an incoming RF signal and transmitting a corresponding regenerated signal at a predetermined frequency, comprises: sweeping a first local oscillator signal through a range of frequencies and mixing the first local oscillator signal with an incoming RF signal; detecting the presence, in the output of the mixed signals, of a first IF signal within a predetermined frequency range and thereupon stopping the sweep; enabling closed-loop frequency locking means which adjusts the frequency of the first local oscillator until the frequency of the first IF signal is equal to a first reference frequency; thereafter sweeping a second local oscillator signal through a range of frequencies and mixing the second local oscillator signal with the output of the first local oscillator; detecting the presence, in the mixed local oscillator signals, of a second IF signal within a predetermined frequency range and thereupon stopping the sweep; enabling the closed-loop frequency locking means to cause it to adjust the frequency of the second local oscillator until the frequency of the second IF signal is equal to a second reference frequency; and thereupon transmitting the signal at the frequency of the output of the second local oscillator. If it is desired to retransmit a frequency substantially identical to the incoming RF carrier frequency, the first and second reference IF frequencies are identical and if the first local oscillator is locked on to the sum of the RF carrier frequency and the IF reference frequency, then the second local oscillator is locked on to a frequency equal to the difference between the first local oscillator frequency and the IF reference frequency. In this manner the reference IF signal is cancelled out and the frequency of the second local oscillator corresponds to the carrier frequency of the incoming RF signal. The same effect is achieved if the first local oscillator is locked on to the difference between the RF carrier frequency and the IF reference frequency while the second local oscillator is locked on to the sum of the first local oscillator frequency and the IF reference frequency.

Preferably the frequency of the first local oscillator is varied in response to the magnitude and polarity of an error signal obtained by comparing the derived IF signal with the reference IF signal, the error signal being reduced to zero only when the frequency of the local oscillator is equal to the sum (or difference) of the incoming RF carrier frequency and the reference IF frequency. Similarly, the frequency of the second local oscillator is preferably varied in response to an error signal obtained by comparing the second IF signal with the second reference IF frequency, the error signal being reduced to zero only when the frequency of the second local oscillator is equal to the difference (or sum) between the frequency of the first local oscillator and the reference IF frequency.

By using a frequency lock loop with a very fast response time, for example as shown in my U.S. Pat. No. 4,083,014, the first local oscillator can be locked to its required frequency during the RF pulse. The RF input is then blanked off during the setting of the frequency of the second local oscillator. Thus retransmission of the RF signal does not have to occur within the period of the RF pulse, and this makes it possible to retransmit a signal which is within a few kilocycles of the original RF carrier frequency.

To achieve a regenerated signal having a frequency offset from the incoming RF frequency, it is only necessary to ensure that the reference frequency supplied to the frequency lock loop when the circuit is operating in its transmitting mode is different from the reference frequency supplied to the loop when the circuit is operating in its receiving mode.

To transmit the regenerated frequency with a variable delay, the output from the second local oscillator can be pulse modulated in response to the output of a pulse generator having a variable pulse repetition rate. The pulse repetition rate may be controlled, for example, by coded signals contained within the received RF pulses.

Figure 2:
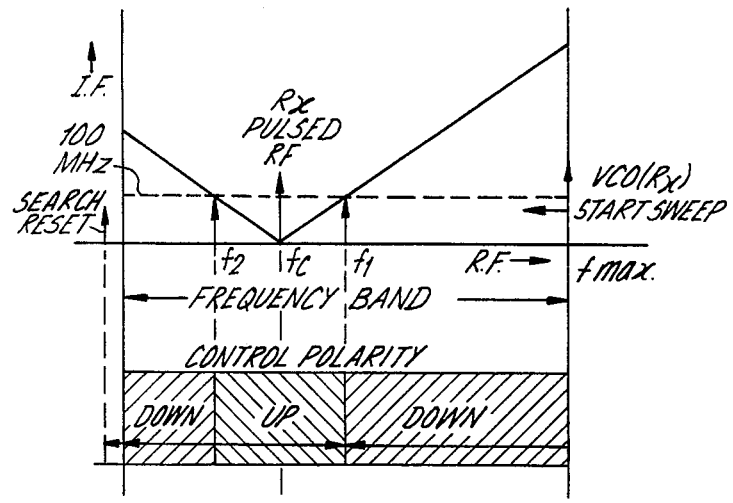
Figure 3:
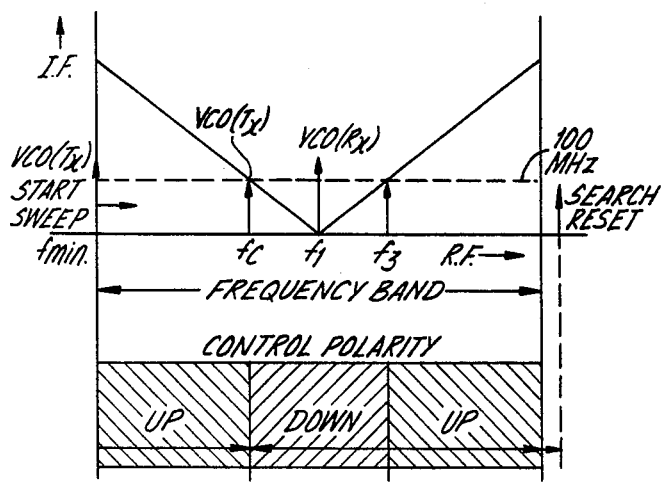
Figure 4:
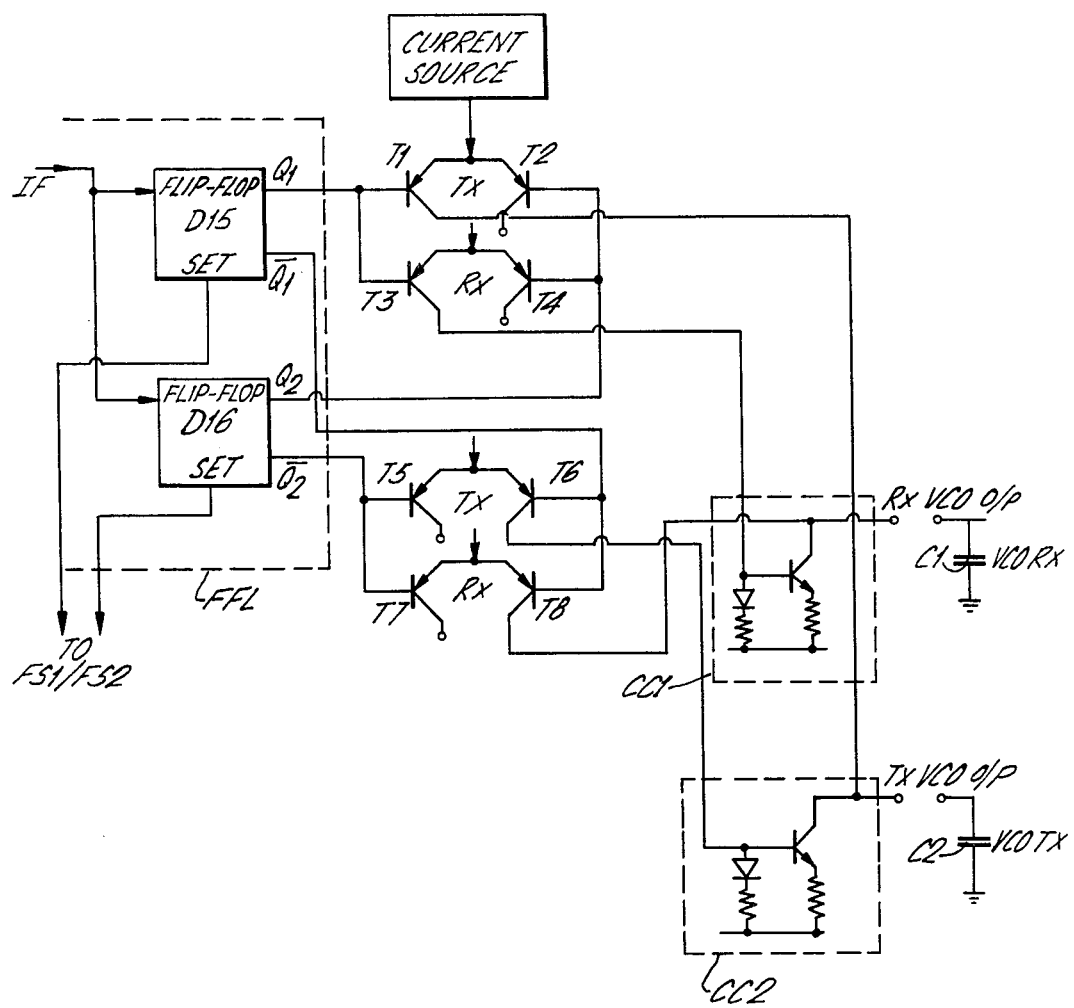

In order that the invention may be more clearly understood, one example of a frequency regenerator embodying the invention will now be described with reference to the accompanying drawings, in which:

FIG. 1 is a block circuit diagram of the regenerator,

FIG. 2 is a diagram illustrating the setting of the frequency of the local oscillator with the circuit of FIG. 1 operating in its receiving mode, FIG. 3 is a diagram similar to that of FIG. 2 illustrating the setting of the frequency of the local oscillator with the circuit operating in a transmission mode, FIG. 4 is a circuit diagram of a portion of the circuit of FIG. 1 illustrating how the output of the frequency lock loop controls the frequency of the local oscillators, and FIG. 5 shows details of a pulse detection and sequence control circuit of FIG. 1.

The circuit of FIG. 1 essentially consists of two heterodyne circuits having a common frequency lock loop FLL which is used in a second phase of each heterodyne circuit, on a time-sharing basis. The first heterodyne circuit includes a receive local oscillator VCO (Rx) and a mixer M1 receiving the output of the receive local oscillator and the incoming RF signal; and the second heterodyne circuit includes a transmit local oscillator VCO(Tx) and mixer M2, which receives the outputs of the transmit local oscillator and the receive local oscillator.

Initially, with the circuit operating in its receiving mode, a "start input" signal is fed to a frequency setting and search sweep control circuit FS1 to sweep the frequency of the local oscillator VCO(Rx) repeatedly from high to low across a wide RF band. Incoming radar pulses are fed to the mixer M1 where the carrier waves in each pulse are combined with the waves from the first voltage-controlled local oscillator VCO(Rx). The frequency lock loop FLL is inhibited during the sweep.

A pulse detector/sequence control circuit ED/SC comprises an envelope detector, as will be described in greater detail, which is triggered whenever the envelope of the RF pulse (as represented by the derived IF signal from mixer M1) exceeds a predetermined threshold level such as to indicate that the IF signal lies within the system bandwidth. In the present example, this means that the IF signal is less than 300 MHz.

The search sweep control circuit essentially comprises a saw-tooth signal generator, the output of which may be switched to the control input of the local oscillator to sweep it through its range offrequencies.

When the signal from the envelope detector indicates that the IF signal is within the system bandwidth, a signal is fed from the pulse detector/sequence control circuit PD/SC to the sweep circuit FS1 to stop the sweep. The frequency lock loop circuit FLL then takes over to produce an IF signal at the same frequency as an IF reference, the frequency of which is fixed by a crystal oscillator S1. The three outputs from the circuit PD/SC to the frequency lock loop SLL comprise a first output for the IF reference signal, a second output for allowing operation of the frequency lock loop, and a third output carrying the derived IF signal from either the mixer M1 or the mixer M2; in the receiving mode which is now being described, the output of the mixer M1 is selected. In the frequency lock loop circuit FLL an error signal is derived having a magnitude proportional to the difference in frequency between the incoming IF and the reference IF. The error signal appears on one of the two polarity outputs from the frequency lock loop FLL, depending on which of the two frequencies being compared is the higher.

The resulting error signal from the frequency lock loop is directed by means of a route control (electronic switching) circuit RC to control the setting of either the local oscillator VCO(Rx) when the system is operating in its receiving mode, or the setting of the local oscillator VCO(Tx) when the circuit is operating in its transmitting mode, the route control circuit RC being appropriately latched to one mode or the other by the pulse detector/sequence control circuit PD/SC.

As stated above, the frequency lock loop adjusts the receive local oscillator until the derived IF signal from the mixer M1 has a frequency equal to that determined by the crystal oscillator S1.

Thereafter, the pulse detector/sequence control circuit PD/SC operates to switch the system to its transmitting mode. A second frequency setting circuit FS2 is then brought into operation to sweep the frequency of the second local oscillator VCO(Tx) from low to high across a broad frequency band and the resulting output is mixed in mixer M2 with the output of the first local oscillator VCO(Rx). At this time the frequency lock loop FLL is inhibited. The sweep continues until the resulting IF output from mixer M2 falls within the system bandwidth, as determined by the envelope detector in the circuit PD/SC. When the transmit intermediate frequency comes within the system bandwidth, the signal from the envelope detector causes a control signal to be sent to circuit FS2 to stop the search sweep and at the same time the frequency lock loop FLL is allowed to function. The output of circuit FLL is switched by the route control circuit to the second local oscillator VCO(Tx) in the transmitting mode.

In this way, the frequency of the transmit local oscillator is locked at a value equal to the difference between the frequency of the receive local oscillator and the reference IF; in this case, this difference is equal to the RF carrier frequency fc.

When the frequency of the transmit local oscillator has been locked to this value, its output is fed to a pulse modulator PM and is retransmitted as a pulse-modulated wave form consisting of bursts of RF energy at a carrier frequency equal to the receive carrier frequency. The pulse modulation is achieved by means of a pulse generator PG which may comprise, for example, a monostable circuit which changes state in response to an output signal from a counter which is clocked from a high frequency source and is controlled by coded signals contained within the received RF pulses. The count required to produce an output signal can be varied and this therefore acts as a variable delay which can be used to set the frequency of the pulse modulation.

Thereafter, the circuit returns to its idle state, in which the receive local oscillator is repeatedly swept through its frequency range and the frequency lock loop is inhibited. The system remains in this state until the next received RF pulse is detected. The circuit cannot receive an incoming RF pulse while it is operating in its transmitting mode.

The manner of operation of the frequency sweep and lock circuits will now be described with reference to FIGS. 2 and 3. As shown in FIG. 2, the sweep starts from the higher frequency (right-hand) end of the frequency range. The polarity of the error signal from the frequency lock loop FLL ensures that the required IF is obtained when the local oscillator is at a frequency $f_1$ which is higher than the RF carrier frequency fc. Thus, if the incoming IF lies below the reference frequency of 100 MHz, the error signal always increases the frequency of the local oscillator until the two frequencies are equal and the local oscillator is at the frequency $f_1$. On the other hand, whenever the frequency of the incoming IF exceed the reference frequency of 100 MHz, the frequency of the local oscillator is decreased until either it reaches the required frequency F1 (i.e. if it is initially too high) or, if already lies below the symmetrically disposed frequency $f_2$ on the other side of the RF carrier frequency fc, until it reaches the minimum frequency of the band at which point the search is reset. In other words, the frequency of the local oscillator is returned to F max. In this manner, the frequency of the local oscillator will always be locked to $f_1$ and not to $f_2$ even though the latter would also produce the required IF. The frequency of the local oscillator is thus equal to the sum of the RF carrier frequency and the reference IF. Referring now to FIG. 3, which shows the IF characteristic in the transmit mode of operation, the polarity of the output from the frequency lock loop now ensures that the oscillator frequency is decreased whenever the incoming IF lies below the reference IF and is increased whenever the incoming IF exceeds the reference IF, until either the frequency reaches fc or, if it is already above $f_3$, the search is reset (i.e. the frequency is returned to f min.) It will be seen that in this way when the transmit IF is equal to the reference IF, the transmit local oscillator VCO(Tx) will be at the incoming RF carrier frequency fc.

It is not necessary that the reference frequency supplied to the circuit PD/SC when the circuit is operating in its receiving mode is the same as that supplied when it operates in its transmitting mode. If the two reference frequencies are different, the transmitted carrier frequency will be offset from the received carrier frequency. The second reference signal can be supplied, for example, from a programmable frequency synthesiser.

Referring now to FIG. 5, which shows the pulse detector/sequence control unit PD/SC, during the frequency sweep under the control of circuit FS1 (i.e. in the receive mode), an "inhibit" signal is applied from circuit FS1 through gate 10 to an AND gate 11 which controls the application of the input IF to the frequency lock loop.

The output of the mixer M1 is applied to the receive envelope detector 12 and when this envelope detector senses the presence of an RF signal it sends a stop signal to the frequency sweep circuit FS1 to stop the sweep. At the termination of the sweep the inhibit signal at AND gate 11 is removed. The other inputs of the AND gate are from the envelope detector 12 and a differential comparator 13 which converts the incoming IF waveform to pulses at logic level. These switch on the AND gate to transmit the IF signal through an OR gate 14 to the frequency lock loop FLL.

During the received RF pulse, the signal from the envelope detector 12 fulfils a further function, namely to switch a receiver monostable circuit 15 which transmits a signal by way of an OR gate 16 to output H of the circuit to enable the frequency lock loop FLL to operate, during the receiving phase, when it receives a signal through gates 11 and 14. Finally, the signal from the receive envelope detector is applied to a delay circuit 17, the purpose of which will be described later.

The frequency lock loop now operates to compare the input IF on output line G with the reference IF applied through a circuit 18 (which converts the reference wave form to a logic level wave form) to the output line I of the circuit PD/SC, as described above.

Reverting to the delay circuit 17, the output of this circuit is connected to one input of an AND gate 19, the other input of which is connected to the second output of the receiver monostable circuit 15. The delay provided by the circuit 17 is such that the output of the AND gate 19 switches a transmitter monostable circuit 20 for a period following the operation of the receiver monostable circuit 15. The monostable circuit 20 operates through the OR gate 16 to enable the frequency lock loop to respond, during the transmitting phase, when it receives a signal through gates 21 and 14.

When the input IF has been locked to the reference IF in the receive mode, the system goes to its "transmit condition" and the second frequency sweep circuit FS2 is brought into operation.

As with circuit FS1, FS2 applies a signal through gate 10 to inhibit operation of AND gate 21 (controlling the application of the input IF to the frequency lock loop) during the sweep. A transmitter envelope detector 22 recognises the point at which the output of mixer M2 (receiving signals from the receive and transmit local oscillators) is within the system bandwidth and the output of envelope detector 22 is then used to stop the transmitter frequency sweep at FS2. The inhibition of AND gate 21 is then removed. The other inputs of this gate are from the transmit monostable circuit 20 and from the transmitter differential comparator 23, which converts the incoming IF signal to a pulse waveform at logic level. The output of AND gate 21 goes through OR gate 14 to the frequency lock loop FLL by way of output G which provides the input intermediate frequency for the frequency lock loop.

The frequency lock loop then functions as explained above to bring the frequency of the second local oscillator VCO(Tx) to the required value relative to the first local oscillator VCO(Rx), as explained above.

One example of an asymmetrical feedback circuit for controlling the frequencies of the two local oscillators is shown in FIG. 4. In this case the output stage of the frequency lock loop comprises a pair of D-type flip-flops D15 and D16. The flip-flop D16 is continuously clocked by the input IF to effectively divide the input frequency by two. The width of the output pulses from D16 is thus dependent on the input IF frequency. The flip-flop D15 is also clocked by the input IF but the trailing edges of the output pulses occur after a time controlled by a timing chain circuit and this time is preset to correspond to the IF reference frequency. The output pulses from D15 thus act as reference pulses. Such a system is more fully described and separately claimed in my U.S. Pat. No. 4,083,014.

Where the sequence control circuit SC consists of a pair of monostables as described above, the output of the first monostable operates a gate (not shown) which controls the current supply to the common emitter connection of the transistor pairs T3, T4 and T7 and T8. These common emitter pairs act as a differential amplifier to compare the width of the output pulses from D15 and D16. The resulting outputs from T3, T4 and T7, T8 control the voltage on a capacitor C1 which determines the frequency of the receive local oscillator VCO(Rx) in a conventional manner. Thus depending on whether the input IF frequency lies above or below the IF reference frequency, the appropriate pair of transistors T3, T4 or T7, T8 will conduct to thereby increase or decrease the capacitor voltage. This action ceases at the cessation of the output from the first monostable.

On the other hand, during the transmit mode of operation (when the first monostable is "off" and the second monostable is "on"), the gated output pulse now gates the current supply to the common emitter connections of the transistor pairs T1, T2 and T5, T6, so that these pairs operate in a similar manner to the pairs T3, T4 and T7, T8 to control the frequency of the transmit local oscillator by controlling the voltage on a capacitor C2. A dc bias on transistors T2, T4, T5 and T7 ensures that they are "on" with no input.

During the search sweep operations, the respective search sweep circuits FS1 and FS2 feed a logic signal to the SET terminals of the flipflops D15 and D16 so that the appropriate pair of transistors is used to charge or discharge the appropriate capacitor C1 or C2. For example, during the receiving mode of operation the logic signal from FS1 will set the Q outputs of D15 and D16 at '1' so that a constant charging current will be supplied to the capacitor charging circuit CC1 through the transistor pair T3, T4. Similarly the capacitor charging circuit CC2 will receive a constant current through the transistor pair T5, T6 when a logic signal from FS2 sets the Q outputs of D15 and D16 at '0'. The 'SET' input is removed from the flip-flops as soon as the sweep ceases, i.e. as soon as the IF falls to within 300 MHz of the required IF.

I claim:

1. A method of detecting an incoming RF signal and transmitting a corresponding regenerated signal at a predetermined frequency, comprising:

sweeping a first local oscillator signal through a range of frequencies and mixing the first local oscillator signal with an incoming RF signal;

detecting the presence, in the mixed signals, of a first IF signal within a predetermined frequency range and thereupon stopping the sweep;

enabling closed-loop frequency locking means which adjusts the frequency of the first local oscillator until the frequency of the first IF signal is equal to a first reference frequency;

thereafter sweeping a second local oscillator signal through a range of frequencies and mixing the second local oscillator signal with the output of the first local oscillator;

detecting the presence, in the mixed local oscillator signals, of a second IF signal within a predetermined frequency range and thereupon stopping the sweep;

enabling closed-loop frequency locking means to cause it to adjust the frequency of the second local oscillator until the frequency of the second IF signal is equal to a second reference frequency; and thereupon transmitting the signal at the frequency of the output of the second local oscillator.

2. A method according to claim 1 in which during the operation of the frequency locking means the frequency of the first local oscillator is varied in response to the magnitude and polarity of a first error signal obtained by comparing the frequency of the first IF signal with the first reference frequency and the frequency of the second local oscillator is varied in response to a second error signal obtained by comparing the frequency of the second IF signal with the second reference frequency.

3. A method according to claim 2 in which the polarity of the first error signal controls the direction in which the frequency of the first local oscillator is varied such that the first local oscillator is locked to a predetermined one of the two possible frequencies lying on opposite sides of the RF carrier frequency to produce the first IF signal, and the polarity of the second error signal controls the direction in which the frequency of the second local oscillator is varied such that the frequency of the second local oscillator is locked to a predetermined one of the two possible frequencies lying on opposite sides of the frequency of the first local oscillator to produce the second IF signal, whereby, if the first and second reference IF frequencies are equal and the frequency of the first local oscillator lies in the opposite sideband to the frequency of the second local oscillator, the frequency of the second local oscillator is equal to the carrier frequency of the incoming RF signal.

4. Apparatus for detecting an incoming RF signal and transmitting a corresponding regenerated signal at a predetermined frequency, comprising:

first and second local oscillators producing first and second signals;

means for sweeping the first local oscillator signal through a range of frequencies;

a first mixer for mixing the first local oscillator signal with an incoming RF signal to provide a mixed signal output;

a first detector for sensing the presence, in the output of the first mixer, of a first IF signal within a predetermined frequency range said first detector having an output;

closed-loop frequency locking means;

means responsive to the output of the first detector to stop the frequency sweep of the first local oscillator when the IF signal within the predetermined frequency range is sensed and to enable the frequency locking means to adjust the frequency of the first local oscillator until the frequency of the first IF signal is equal to a first reference frequency;

means for sweeping the second local oscillator signal through a range of frequencies;

a second mixer for mixing the second local oscillator signal with the output of the first local oscillator to provide a mixed signal output;

a second detector for sensing the presence, in the output of the second mixer, of a second IF signal within a predetermined frequency range said second detector having an output;

means responsive to the second detector output to stop the sweep of the second local oscillator when the second IF signal is detected within the predetermined frequency range and to enable the closed-loop frequency locking means to cause it to adjust the frequency of the second local oscillator until the frequency of the second IF signal is equal to a second reference frequency;

and means using the output of the second local oscillator to transmit a signal at the frequency to which the second local oscillator has been adjusted.

5. Apparatus according to claim 4 in which the frequency locking means is a frequency lock loop operable in either a receiving mode or a transmitting mode such that, in the receiving mode, a first polarity output from the frequency lock loop varies the frequency of the first local oscillator in a first direction whenever the frequency of the first IF signal lies below the first reference frequency and a second polarity output from the frequency lock loop varies the frequency of the first local oscillator in the opposite direction whenever the frequency of the first IF signal exceeds the first IF reference frequency, whereas, in the transmitting mode, the first polarity output varies the frequency of the second local oscillator in the said opposite direction and the second polarity output varies the frequency of the second local oscillator in the first direction, and means for resetting the frequency of the respective local oscillators whenever the respective IF signals exceed predetermined upper or lower threshold frequency levels.

6. Apparatus according to claim 4 further comprising a pulse modulator for modulating the output of the second local oscillator.

7. Apparatus according to claim 6 further comprising a pulse generator responsive to the reception of an RF pulse for feeding pulses to the pulse modulator to control the frequency of the pulse modulation.

* * * * *